United States Patent [19]

Feldman

[11] Patent Number: 5,894,674
[45] Date of Patent: Apr. 20, 1999

[54] METHOD AND APPARATUS FOR DETERMINING DIRECTION

[75] Inventor: Howard Feldman, Kenton, United Kingdom

[73] Assignee: International Mobile Satellite Organization, United Kingdom

[21] Appl. No.: 08/750,079

[22] PCT Filed: Jun. 6, 1995

[86] PCT No.: PCT/GB95/01300

§ 371 Date: Jan. 28, 1997

§ 102(e) Date: Jan. 28, 1997

[87] PCT Pub. No.: WO95/34101

PCT Pub. Date: Dec. 14, 1995

[30] Foreign Application Priority Data

Jun. 7, 1994 [GB] United Kingdom .................. 9411393

[51] Int. Cl.⁶ ........................................... G01C 21/20
[52] U.S. Cl. ..................... 33/354; 33/1 CC; 33/352; 33/431
[58] Field of Search ..................... 33/354, 1 C, 1 CC, 33/15 C, 268, 272, 274, 351, 352, 431, 349, 333, 334; 434/153

[56] References Cited

U.S. PATENT DOCUMENTS

| | | | |
|---|---|---|---|
| 1,984,390 | 12/1934 | Wright | 33/431 |
| 3,634,939 | 1/1972 | Sorem . | |
| 3,844,041 | 10/1974 | Wilson, Jr. | 33/431 |
| 4,138,826 | 2/1979 | Inge | 33/268 |
| 4,372,052 | 2/1983 | Wakim | 33/1 CC |
| 4,454,658 | 6/1984 | Lewis | 33/268 |
| 4,696,109 | 9/1987 | Whalet, Jr. | 33/1 SC |
| 4,725,236 | 2/1988 | Neri Vela et al. | 33/1 CC |
| 4,905,377 | 3/1990 | Martinez et al. | 33/333 |
| 4,941,264 | 7/1990 | Poirier | 33/431 |
| 5,105,544 | 4/1992 | Ontiveros et al. | 33/431 |
| 5,274,926 | 1/1994 | Dillon | 33/268 |
| 5,276,972 | 1/1994 | Staney | 33/1 SC |

FOREIGN PATENT DOCUMENTS

| | | |
|---|---|---|
| 2654857 | 5/1991 | France . |
| A 60-134604 | 7/1985 | Japan . |
| A 60-206302 | 10/1985 | Japan . |
| A 01-129506 | 5/1989 | Japan . |
| 659320 A5 | 1/1987 | Switzerland . |
| 1537389 | 12/1978 | United Kingdom . |

Primary Examiner—Christopher W. Fulton
Attorney, Agent, or Firm—Banner & Witcoff, Ltd.

[57] ABSTRACT

A map is provided for indicating the direction of a fixed point (S), such as a sub-satellite point, from any point (P) within a specified area which is a substantial fraction of the earth's surface. The map projection is such that the actual direction to the fixed point (S) is the same as the direction shown on the map, when the map is aligned with a reference direction such as magnetic north. Optionally, the distance to the fixed point on the map represents the elevation of the satellite. Apparatus for using the map includes a holder (10) for the map and for a magnetic compass (18). A scale (22) which rotates about the fixed point on the map has a marker (32) which is positioned over the user's location on the map. The azimuthal direction of the satellite is indicated by an arrow (28) on the scale, while the elevation of the satellite is read off the scale by means of a pointer (34) located on the fixed point on the map.

28 Claims, 8 Drawing Sheets

METHOD AND APPARATUS FOR DETERMINING DIRECTION

TECHNICAL FIELD

The present invention relates to a method and an apparatus for determining the direction of a defined position from a variable position. The present invention is particularly directed towards determination of the direction that an antenna for a portable communications terminal (the variable position) must be pointed to find a communications satellite (the defined position).

In telecommunications, a signal may be transmitted using microwaves or over a cable. As microwaves are easily absorbed by solid objects, the use of microwaves in telecommunications requires that the transmitter and receiver be in line of sight. Communications satellites provide a method of achieving line of sight communication over long distances. Communication between the satellite and terrestrial communication networks is provided via a land earth station which lies within the coverage area of the satellite.

In remote areas, where telephone services are either inadequate or unavailable, portable telephones and data terminals which directly access a communications satellite may be used, by means of a satellite communications service such as the InmarsatM$^{SM}$ service. Such satellite telephones, also known as Mobile Earth Stations (MES) are being used by news agencies, U.N. relief agencies and other groups which operate in remote areas. New models of MES may be as small as a large briefcase.

One particular feature of an MES, as compared with cellular telephones, is that the antenna is not small and omni-directional but, instead, must be pointed towards the satellite before the MES can be used. The antenna is relatively large, about 30 cm in diameter and typically has a beamwidth of 15° to 20°. Thus, a user of an MES must be able to determine the direction of the satellite from his location sufficiently accurately to pick up a signal from which the antenna can be directed more accurately by optimising the signal—he must be able to determine both the compass direction to the satellite (the azimuthal component) and the elevation of the satellite in the sky. It is also useful to be able to make at least a rough determination, before the MES is set up, of the direction of the satellite from the user's general location to ensure that there are no solid objects, such as buildings or trees, blocking the line of sight between the satellite and the user's location.

BACKGROUND ART

Various methods have been used for determining the direction to a satellite from a variable location. It is known to use a computer or processor to calculate the required elevation and azimuth to a selected satellite from data regarding the location of the user. Such data may be entered into the computer as the user's latitude and longitude read from a world map or by indicating the user's location using a cursor in an electronic display showing a world map. Alternatively, the user can make use of a map, such as that shown in FIG. 1. The map is of a standard projection but the map grid does not show the normal lines of latitude and longitude. Instead, the map grid is a curvilinear grid showing lines of azimuth and elevation for a particular satellite so that the user can determine the correct azimuth and elevation for his location by finding the location on the map. In all these methods, the user then employs a compass to point the antenna in the required azimuthal direction and adjusts the angle of the antenna to set the elevational component of the direction to the satellite.

Disclosure of the Invention

According to a first aspect of the present invention, there is provided a method of determining the direction of a defined position from a variable position within a specified area, the specified area including positions which are separated from said defined position by a number of degrees of latitude or longitude greater than a predetermined limit, using an arrangement comprising a map of said specified area and a map defined point positioned relative to said map to represent said defined position relative to said specified area, said map having a map reference direction by which the azimuthal orientation of the map is determined in use, said map having a projection in which map points on the map represent positions in reality such that:

i) azimuthal position-reference directions from each position in reality to a single reference position are representable by map point-reference directions on the map which are parallel to or aligned with said map reference direction to within said predetermined limit;

ii) a map bearing on the map of a map point-defined direction from a map point on the map to said map defined point relative to said map reference direction equals within said predetermined limit a bearing in reality of an azimuthal position-defined direction from a position in reality to said defined position in reality relative to an azimuthal position-reference direction from said position in reality to said reference position in reality;

the method comprising the step of determining the azimuthal component of said direction of said defined position from said variable position by a) orienting said map so that said map reference direction is aligned with the azimuthal direction from said variable position in reality to said single reference position;

b) locating a map variable point on the map representing said variable position in reality; and c) determining a map variable-defined direction from said map variable point to said map defined point which represents said azimuthal component of said direction of said defined position from said variable position.

The present invention relates to the determination of direction between positions which are separated from one another by at least a certain is distance, e.g. the global distances involved when determining the direction of a satellite from a position within the coverage region of the satellite. It is well known that the projection of the curved surface of the earth onto a planar surface will involve some distortion of scale, bearing, shape or area. This distortion becomes significant for large distances and may be too great to be tolerated for certain applications.

In arriving at the present invention, the inventor has realised that the action of determining the direction of a defined position from a variable position over a global area, particularly in the context of determining the direction an antenna should be pointed to communicate with a satellite, need not be as complicated as has been the case in the prior art. The prior art operation has required that information regarding the azimuthal direction be derived from a computer or a map. It is then necessary to transfer this information to the context of determining the azimuthal direction in reality from the user's location by using a compass. In contrast, the inventor has appreciated that the azimuthal direction can be determined in reality and visually by using a map of the correct projection. When such a map is orientated with reality, the direction between points representing the user's location and a defined position on the map will correspond to the required azimuthal direction in reality of the defined position from the user's location and so may be seen visually from the map without the need for the information to be processed further in any other way.

Where the method uses a magnetic compass, the single reference position is magnetic north. Thus, the map projection accommodates both errors due to the distortion involved in projecting a curved surface onto a planar surface and also the distortion caused by the fact that magnetic north is not the same as true north.

Advantageously, the map has a projection such that map points which are equidistant from said map defined point represent positions in reality which are equidistant from said defined position in reality, the method including the further step of determining the elevational component of said direction of said fixed position from said variable position by determining the separation of said map variable point from said map fixed point, said separation representing said elevational component. The same map may therefore be used to determine both the azimuthal component and the elevational component of a direction from a variable position to a defined position, such as the position of a satellite.

It will be appreciated that this advantageous feature is particularly applicable to a method of determining the direction of a satellite from a variable position in which the specified area is the coverage region of the satellite. Thus, the first aspect of the present invention also provides a method of setting up a satellite antenna.

A second aspect of the present invention provides an apparatus for determining the direction of a defined position from a variable position within a specified area, the apparatus comprising:

compass means;

map means for providing a map, said map means including compass holding means for holding the compass means relative to said map means.

Thus, if the user orientates the map with reality by using the compass means, then the direction between the user's location and the defined position on the map will correspond to the required azimuthal direction of the defined position from the user's location. The map means is effective to provide a map in a flat position.

Determination of the required azimuthal direction of the defined position from the user's location is sufficient when the defined position is a terrestrial location. One such defined position is Mecca which Muslims are required to face when they pray.

If the compass means includes a magnetic compass, a modified map may be used in which points on the map have been moved to compensate for magnetic declination.

It is envisaged that a map of the required projection may form at least part of the map means. Alternatively, or in addition, the map means may comprise map holding means for holding one or more maps in a flat position. The map holding means may be arranged for releasably holding the map so that the same structure may be used for different maps depending on the location of the user and the satellite to be used.

Advantageously, the apparatus further comprises straight line means for representing a straight line extending at least from a fixed location to a different location on the map, said straight line means and said map means preferably being rotatable relative to one another about said fixed location. When the apparatus is arranged with the map defined point coincident with said fixed location and the straight line represented extends from said fixed location to the map point representing the required variable position, this facilitates determination of the azimuthal direction.

Preferably, said straight line means includes marker means located on said straight line for marking out another location on the map, said marker means advantageously comprising magnifying means so that the location of a map point representing said variable position on the map can be easily found. For this reason, said marker means are advantageously movable along said straight line relative to the fixed location on the map.

Conveniently, said straight line means includes a straight line mark either aligned with said straight line or extending parallel to said straight line from which the require azimuthal direction may be easily determined.

The map may further include a direction indicator for indicating a compass direction of the map, such as north, relative to the compass means so that the compass needle of the compass means can be easily aligned with the compass direction to ensure that the map is orientated with reality.

It is further envisaged that the compass means may be supplied separately from the remainder of the apparatus. Accordingly, a third aspect of the present invention provides an apparatus for determining the direction of a defined position from a variable position within a specified area, the apparatus comprising:

map means for providing a map, the map means including straight line means for representing a straight line extending at least from a fixed location to a different location. The map means are effective to provide a map in a flat position.

An advantage of the present invention lies in its simplicity so that it can be easily used in remote areas with a portable satellite telephone or other means for communicating with a communications satellite.

Accordingly, a fourth aspect of the present invention provides the combination of means for communicating with a communications satellite and an apparatus according to any one of the accompanying claims.

BRIEF DESCRIPTION OF THE DRAWINGS

Embodiments of the present invention will now be described, by way of example only, and with reference to the accompanying drawings, in which.

MODES OF CARRYING OUT THE INVENTION

FIGS. 2 and 3 illustrate an explanation of how a standard map projection may be modified to derive the novel map projection of the present invention.

Figure 1:
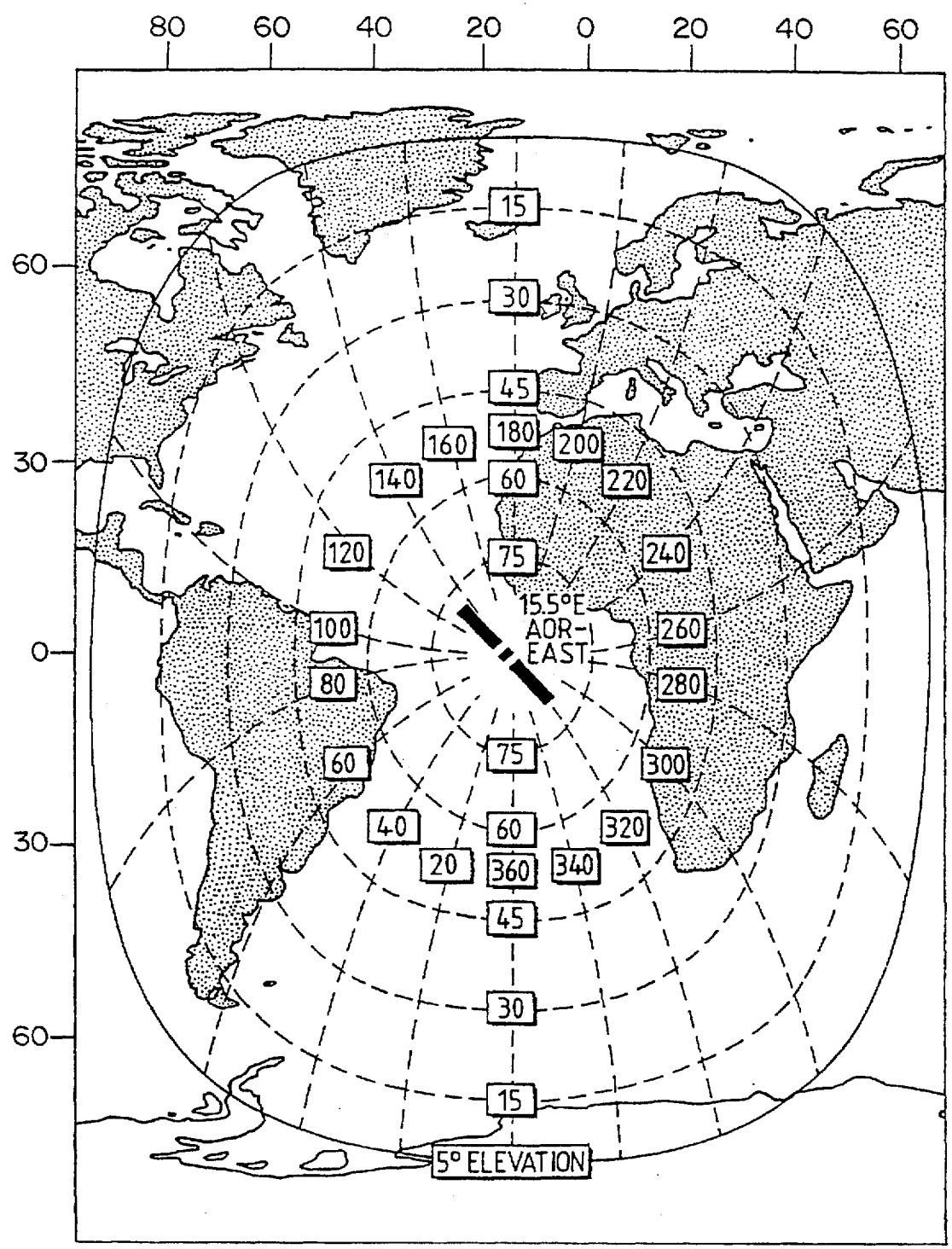
FIG. 1 shows a prior art map of the Atlantic Ocean region with a map grid of lines of azimuth and elevation.
Figure 2A:
FIGS. 2a, 2b, 2c, 2d, 2e and 3a, 3b, 3c, 3d, 3e illustrate an explanation of the production of a map having a map projection suitable for use with embodiments of the present invention.

FIG. 2a represents a standard Orthographic projection. This example is centred, at 0 deg latitude, 15 deg West Longitude, and the part of the globe shown represents the "region of interest", namely the coverage region of an Inmarsat AOR-E satellite. The AOR-E satellite is in geosynchronous orbit approximately at 15 deg West Longitude.

Figure 2B:
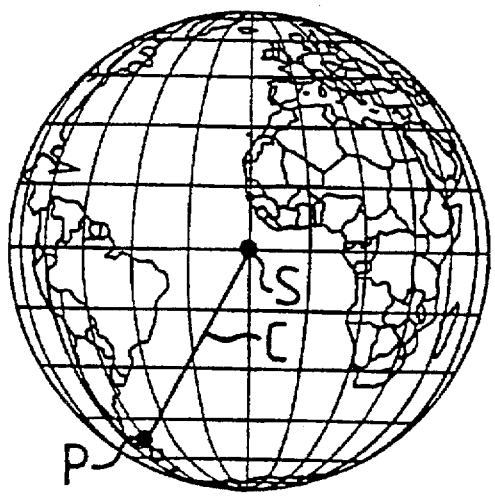
Figure 2C:
Figure 2C:
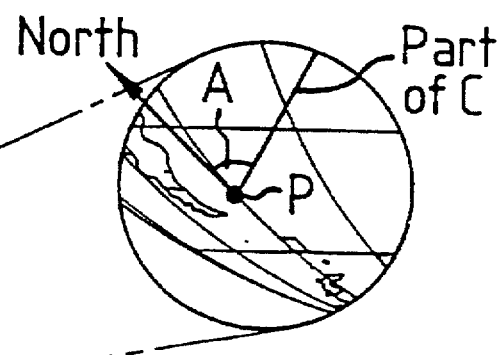

FIG. 2b shows the same map, and indicates a point labelled "S", in this case the sub-satellite point, which represents the point toward which the user wants to find the direction, or "azimuth". The user may want to be able to find the distance or elevation as well. Also in the second figure is point "P", an arbitrary point of the map, which is to be replotted in the final map projection. Between points P and S is arc C, which represents the "great circle" route from P to S, i.e. the route of shortest distance from P to S along the globe surface.

Arc C between P and S has two properties of interest. One is the length, which is roughly proportional to the great circle distance from P to S. Consequently, when S represents a sub-satellite point, the arc C is approximately proportional to the elevation of the satellite to an observer at P. The second property of interest is angle A between arc C and a line running north, shown in the expanded area in FIG. 2c. In this expanded view, the direction toward north, for an observer at point P, is as shown. One might incorrectly position the local north arrow vertically, if one did not consider that a flat map cannot represent a spherical globe adequately. As an assurance, note that the indication of local north is always tangent to a line of longitude at point P. Angle A is that angle which lies in a plane tangent to the globe's surface at point P; this plane is not coincident with the plane of the paper on which the map is drawn, and so it must be calculated and cannot be measured directly from the plot. For example, note that on a spherical globe, lines of latitude are always perpendicular to lines of longitude—but in the expanded view shown here they appear not to be so.

Figure 2D:
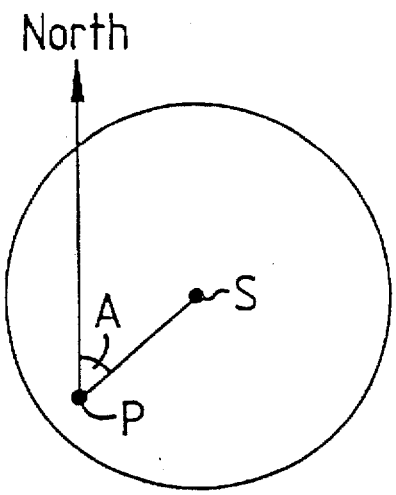

In FIG. 2d, a circle has been drawn, in which the new projection will be plotted. Point S has been conveniently placed in the centre of the circle. Point P has been plotted such that the length of line segment PS is proportional to the length of C, and angle A as drawn on paper equals angle A as calculated in FIG. 2c. Note that in the new projection in FIG. 2d, North is always a vertical line, because the map will be oriented with North at the top, whenever a user is physically located at some point P.

Figure 2E:

This procedure of translating point P from its position in the map in FIG. 2a to the new position in the projection of FIG. 2d is repeated for all points on the map within the desired map region, resulting in FIG. 2e.

It will be appreciated that the novel map projection may, in fact, be prepared using an appropriate computer program and a database of points of longitude and latitude.

Figure 3A:
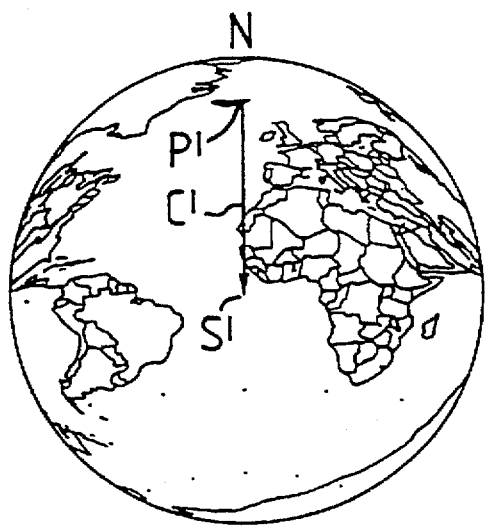
Figure 3B:
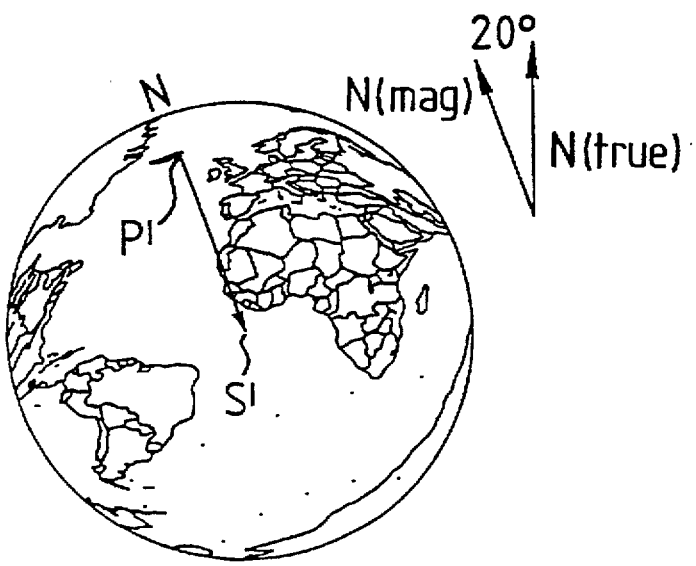
Figure 3C:
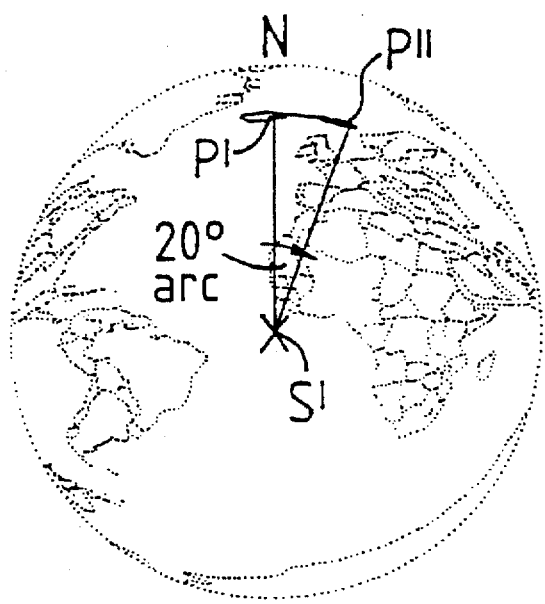
Figure 3D:
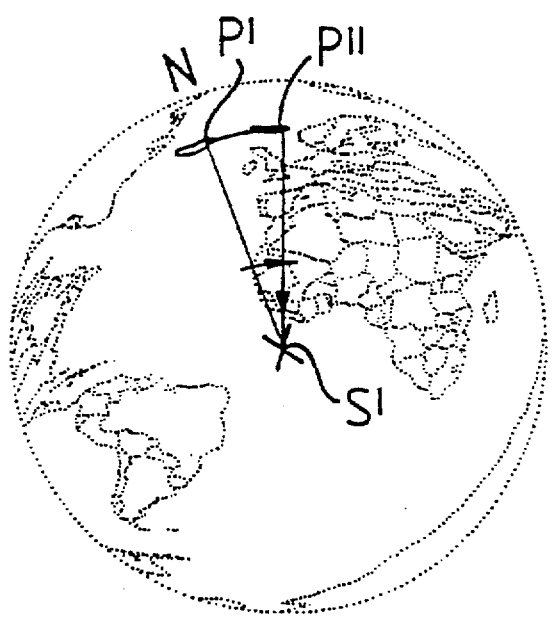

As indicated, the map projection of FIG. 2e has a map reference direction, by which the azimuthal orientation of the map is determined in use, pointing towards North. Other reference directions may be chosen depending on how the map is to be orientated in use. In particular, it will be appreciated that conventionally used magnetic compasses point towards magnetic north pole rather than true north pole. This magnetic declination varies at different points on the earth's surface. For example, in Iceland the compass error due to magnetic declination is about 20°. A map may therefore be modified, as shown in FIGS. 3a, 3b, 3c, 3d and 3e to compensate for this magnetic declination. FIG. 3a shows a map of the projection of FIG. 2c. An arrow C' shows the correct direction from Eastern Iceland (P') to the map defined point S', (representing the point toward which the user wants to find the azimuthal direction) if the map is orientated towards true north. However, if a magnetic compass is used, the actual orientation of the map will be as shown in FIG. 3b and so there will be an error of 20° in the azimuthal component. To compensate for this magnetic declination, the map may be redrawn, as shown in FIG. 3c, such that Eastern Iceland (P") is moved 20° in an arc around the defined point S'. Then, as shown in FIG. 3d, the arrow between the user's location in Eastern Iceland (P") and the defined point S' will be pointing in the correct direction.

As the magnetic declination will vary from place-to-place on the earth, it will be necessary to repeat this procedure for every point of interest on the map. The arc around the fixed point through which each location must be moved is equal and opposite to the direction of the local magnetic declination. In practice, such modifications to a map to compensate for magnetic declination could be prepared by a draughtsman, or with the aid of a computer, with the help of a map showing global magnetic declination, such as Chart 5374 published by the British Geological Survey. A map projection prepared in this way is shown in FIG. 3e.

Figure 3E:

It will be appreciated that the projection of FIG. 3e may be so distorted relative to standard projections that the user may find difficulty in recognizing locations on the map. Thus, the projection of FIG. 3e may be further modified within certain limits for artistic and usability reasons. For use with a satellite antenna, the map bearings of the projection should be equal to the required bearings in reality within the limit of the beamwidth of the antenna, typically 15 to 20°. It will be appreciated that the area of the map covers a number of degrees of latitude or longitude which is greater than the limit set on the accuracy of the bearings by the use of the map. For maps in which all points of the map are separated from the point of interest by a number of degrees of longitude or latitude less than the accuracy of the map bearings, the need to use a map of the novel projection is less critical.

In a general form, an embodiment of an apparatus of the present invention may consist of a board on which is fixed a map and a compass. An arrow is fixed on the map in such a way that it rotates about a map defined point representing the defined position relative to the area of the map. It is not essential that the map defined point be within the map although the map defined point is typically at the centre of the map. The point of the arrow is at the map defined point on the map and the tail of the arrow is at the edge of the map so that the length of the arrow equals the radius of the map. Because both the map and the compass are held by the board, re-orientation of the board will affect the orientation of the map as indicated by the compass. Using the compass, the user therefore positions the north side of the map towards north in reality so that the orientation of the map conforms with reality. The arrow is then rotated such that it lies on top of a point representing the user's current position on the map. Because the map has been oriented to conform with reality, the arrow now points in the azimuth direction towards the sub-satellite position. The antenna of the satellite telephone can therefore easily be pointed in the azimuth direction of the sub-satellite point by aligning the antenna with the arrow.

It has further been appreciated that the separation of the map defined point from the point representing the user's current location on the map is, using this projection, proportional to the elevation of the satellite from the user's current location. The arrow may therefore be calibrated with a series of numbers ranging from 0 at the arrow's point to 90 at the arrow's tail. If the arrow is allowed to slide forward and backward along its length, its direction will not change but its radial position can be adjusted so that the tail of the arrow lies on the user's current location. The number written on the arrow which lies at the pivot is the satellite elevation.

It is further envisaged that the present invention may be applied to other circumstances in which a person needs to be able to determine the direction from his current location to a defined position in the world. One such fixed position is Mecca as Muslims are required to face towards Mecca when they pray. As Mecca is a terrestrial location, elevation is not required so the arrow must be able to rotate but does not need to be able to slide. The map coverage required will obviously depend on the areas in which the user will find himself. The implementation is preferably suitable for permanently fixing onto a prayer rug.

Figure 4:
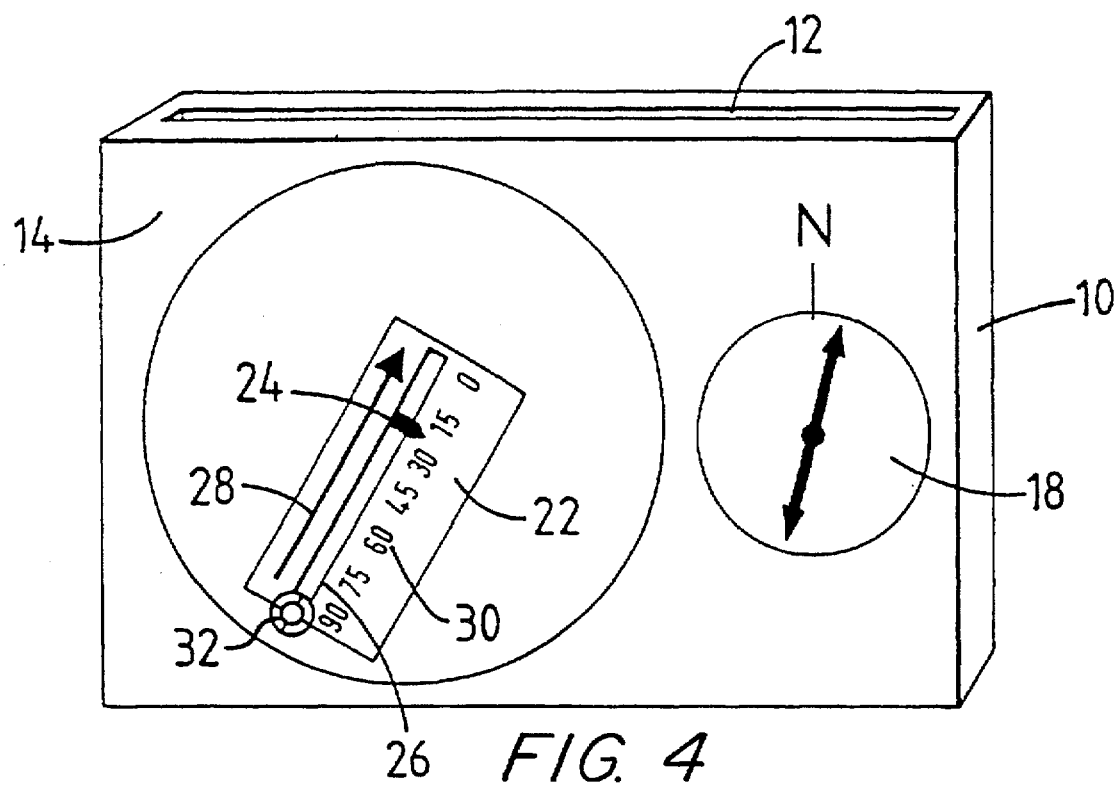
FIG. 4 shows a first embodiment of an apparatus provided in accordance with the present invention.
Figure 5A:
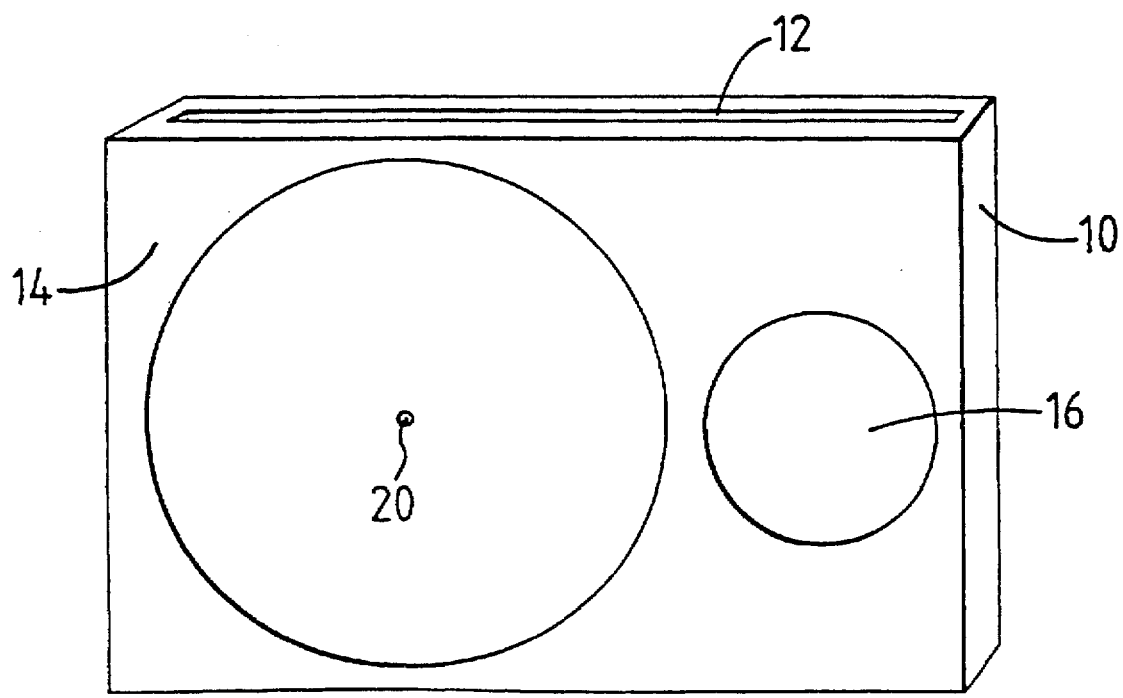
FIGS. 5a, 5b, 5c and 5d show components of the apparatus of FIG. 4.

FIG. 4 shows a first embodiment of the present invention as used for determining the direction of a satellite from a variable position. The apparatus comprises a holder or envelope 10 having a slot 12 into which a map may be slid. As the holder 10 does not fixedly hold the map, the structure may be used with different maps depending on the location of the user and the satellite which the user intends to use. Conveniently, the holder is made of plastics material. At least the front face 14 of the holder is transparent so that the map is visible from outside. As shown in FIG. 5a, the holder 10 further includes a hole or inset 16 for holding a compass 18. A hole 20 is provided at a fixed location onto which an indicator 22 can be mounted using a pivot structure 24.

Figure 5B:
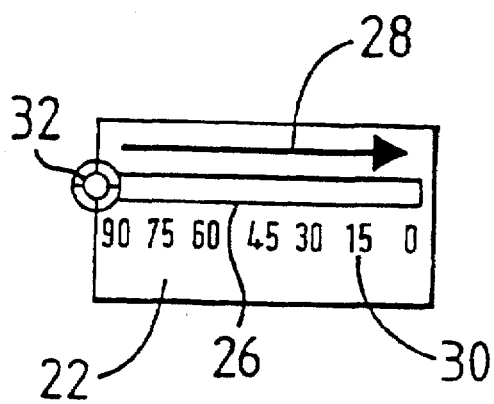

The indicator 22, as shown in FIG. 5b, comprises a plastic rectangular structure which is held on the holder 10 by the pivot 24. The indicator 22 includes a straight slot 26, through which the pivot 24 extends, such that the indicator 22 can be rotated about the pivot and also slid backward and forward relative to the pivot along the slot. The indicator 22 also includes an arrow 28 to indicate azimuth direction and is calibrated, as at 30, to indicate elevation. A lens 32 is provided at one end of the slot 26 to assist in determining the point representing the user's exact position on the map.

Figure 5C:
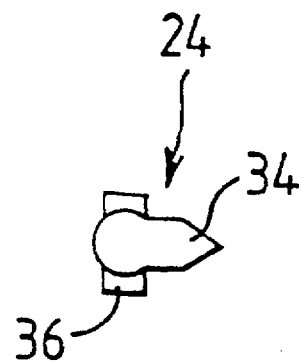

The pivot structure 24 is shown in greater detail in FIG. 5c. The pivot structure includes a pointer 34, effective to define the fixed position on the map, and used to point to the calibrations 30 on the indicator 22 which refer to elevation. Beneath the pointer 34 is a tab 36 relative to which the indicator 22 can slide. Beneath the tab 36 (not visible in FIG. 5c) is a plug by which the pivot structure 24 is securely mounted in the holder 10. The pivot structure therefore fastens the indicator 22 to the holder 10 but allows the indicator 22 to both rotate and slide.

In the embodiment of FIG. 4, the arrow 28 is drawn to lie parallel to the straight slot 26. The indicator 22 is effective to represent a straight line from the map defined point on the map to another point on the map because of the lens through which the point representing the user's exact location on the map can be identified. It is envisaged that the indicator 22 may be effective to represent a straight line even if no straight line is actually marked on the indicator. For example, dotted lines may be used to represent a straight line. Alternatively, the direction of a straight line can be uniquely defined by two points, one of which is the map defined point and the other of which assists in defining the user's current location. The lens 32 advantageously magnifies the map for easier identification of the point representing the user's current location on the map.

Figure 5D:
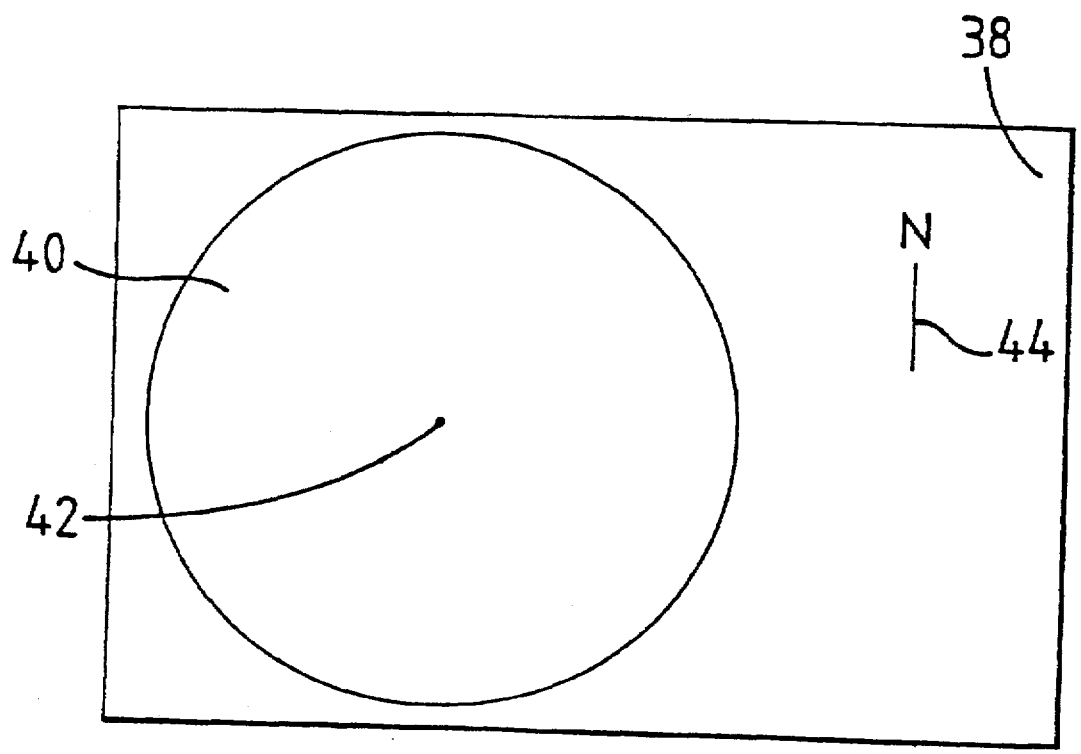

FIG. 5d shows a sheet 38 for insertion into the holder 10. The sheet 38 is preferably dimensioned so that it can be easily slid into the holder 10 but is not movable within the holder 10. The circle referenced 40 indicates the position of the printed map and the point 42 indicates the map defined point or sub-satellite point. This point 42 is positioned immediately below the fixed location of the hole 20 and so corresponds in position to the pivot structure 24. Also printed on the sheet 38 is a line 44 indicating the direction north for the map 40. The line 44 is so positioned on the sheet 38 that it will be in the right position relative to the compass 18 in the assembled structure. Thus, when the map is orientated so that the compass needle, pointing north, is aligned with the line 44, then the map also will be orientated with its north side towards north. Thus, the apparatus provides a simple structure by which a map may be correctly orientated with reality so that a direction indicated by the map points to the direction in reality.

Figure 6A:
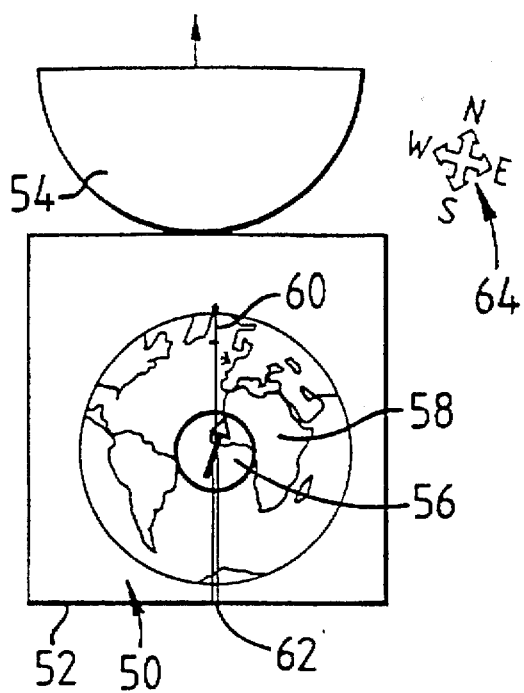
FIGS. 6a, 6b, 6c and 6d show a second embodiment of an apparatus provided in accordance with the present invention.

FIG. 6a shows a second embodiment of an apparatus according to the present invention in which the apparatus is incorporated into the equipment which is to be pointed towards a defined position. The apparatus 50 is provided on an MES 52 having a directional antenna 54. A compass 56 is mounted at the centre of a map 58 of the required projection. north is indicated on the map 58, as by a line 60, so that north as indicated by the compass can be easily aligned with the north of the map 58. A strip 62 is mounted to be slidable in a slot of the MES 52 and aligned with or parallel to the antenna direction. Means (not shown) are provided to enable the map 58 and the strip 62 to be rotated relative to one another. Also shown in FIG. 6a, to assist a description of the operation of the apparatus, is a compass star 64 to indicate north in reality.

Figure 6B:
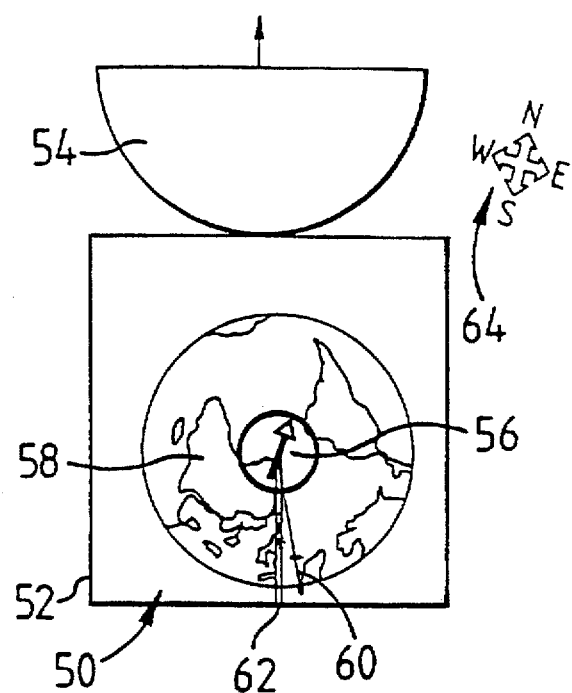

In FIG. 6b, the map 58 has been rotated relative to the MES 52, as a whole, and the strip 62 such that the point representing the user's position (in this example, London) is over the strip 62.

Figure 6C:
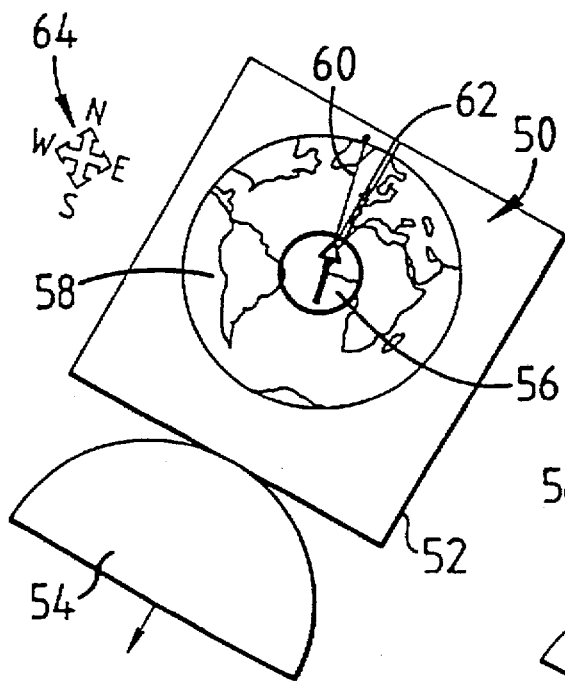
Figure 6D:
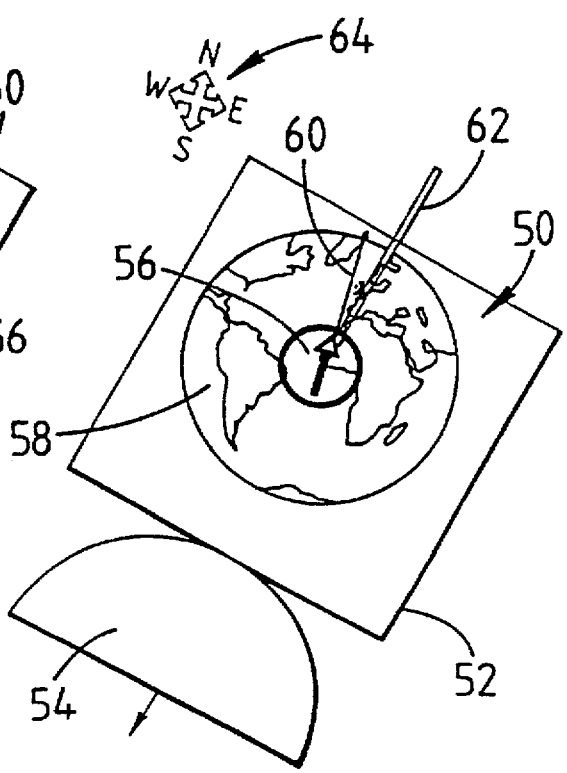

In FIG. 6c, the MES 52, as a whole, has been rotated until the north of the map, as indicated by the line 60, is aligned with the compass north. As the strip 62 is aligned with the antenna 54 and with the points representing the defined position and the user's position on the map, the antenna is therefore pointing in the correct azimuthal direction towards the defined position of the satellite.

In FIG. 6c, the strip 62 is slid until its upper end is positioned at the point representing London on the user's map. The strip 62 is calibrated to indicate the elevation of the satellite. Thus, the required elevation can be read off the strip 62 and so the elevation of the directional antenna 54 can be adjusted.

Figure 7:
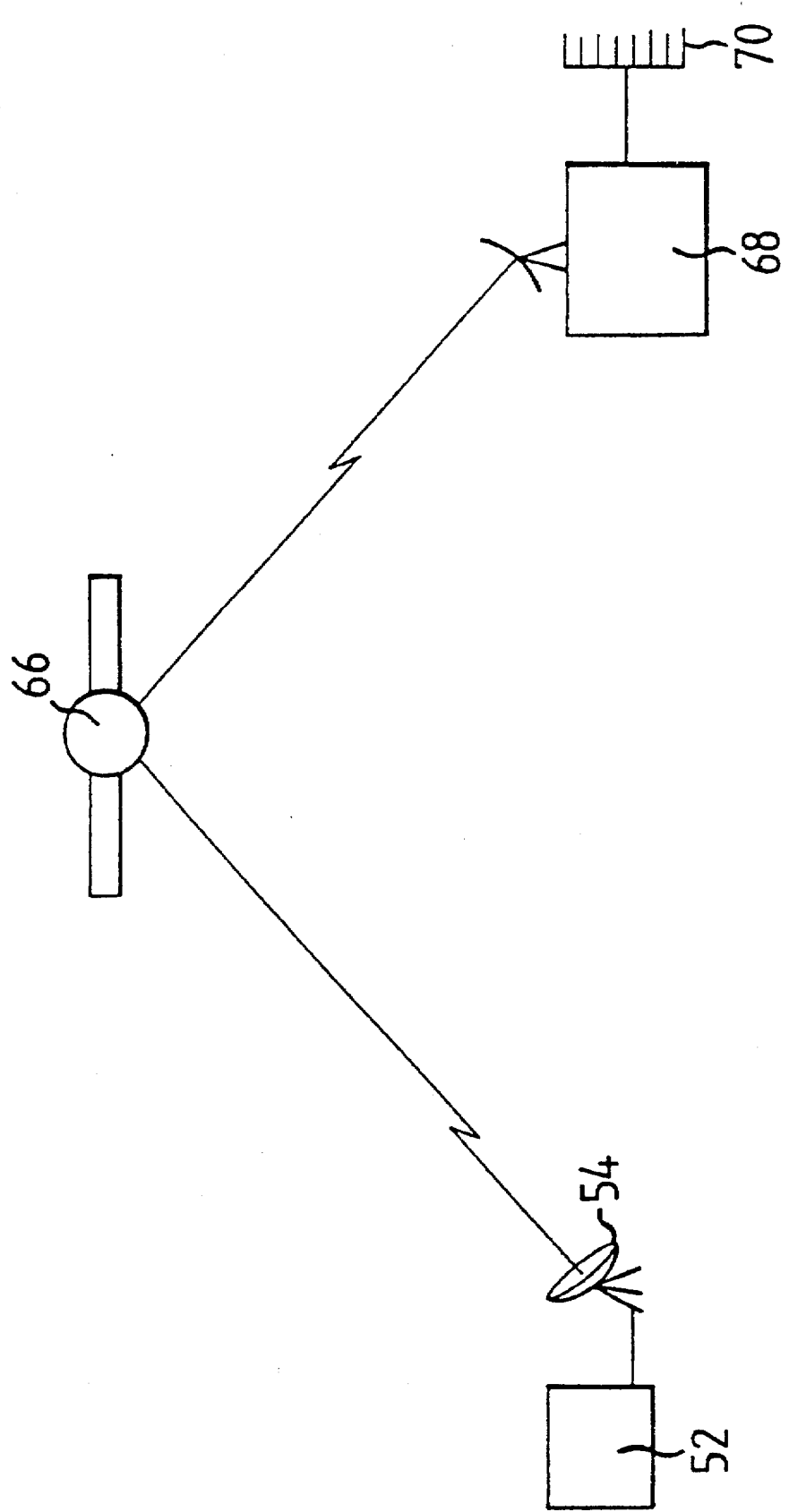
FIG. 7 shows an MES communicating with a land earth station by means of a directional antenna pointed at a satellite.

In FIG. 7, the azimuthal direction and elevation has been arranged so that the directional antenna 54 is pointing at the satellite, indicated by reference 66. The user of the MES 52 then initiates a call via the satellite 66 to a land earth station (LES) 68, which provides a gateway to a terrestrial telephone network 70. The MES 52 may have data or fax communication facilities, as well as or instead of audio communication facilities.

In the embodiments shown, the map is releasably mounted in the apparatus so that the same apparatus may be used for different maps depending on the location of the user and the satellite to be used. Alternatively, one or more maps may be printed onto a card to which a compass and/or a straight line marker may be affixed.

Map projections are also envisaged where the required defined point is a terrestrial location such that there is no elevational component. In such map projections, there may be regions of the map which may be moved closer together on the map without losing azimuthal information. The modified map is smaller than the map of FIGS. 2 and 3. Because of the modification of the map, the elevation information has been lost but the azimuthal information has been retained.

Industrial Applicability

The method of the present invention may be applied in the field of telecommunications, while the apparatus of the present invention may be manufactured industrially.

I claim:

1. A method of determining the direction of a defined position from a variable position within a specified area, the specified area including positions which are separated from said defined position by a number of degrees of latitude or longitude greater than a predetermined limit, using an arrangement comprising a map of said specified area and a map defined point positioned relative to said map to represent said defined position relative to said specified area, said map having a map reference direction by which the azimuthal orientation of the map is determined in use, said map having a planar projection in which map points on the map represent positions in reality such that:

i) azimuthal position-reference directions from each position in reality to a single reference position are representable by map point-reference directions on the map which are parallel to or aligned with said map reference direction to within said predetermined limit;

ii) a map bearing on the map of a map point-defined direction from a map point on the map to said map defined point relative to said map reference direction equals within said predetermined limit a bearing in reality of an azimuthal position-defined direction from a position in reality to said defined position in reality relative to an azimuthal position-reference direction from said position in reality to said reference position in reality;

the method comprising the step of determining the azimuthal component of said direction of said defined position from said variable position by a) orienting said map so that said map reference direction is aligned with the azimuthal direction from said variable position in reality to said single reference position;

b) locating a map variable point on the map representing said variable position in reality; and c) determining a map variable-defined direction from said map variable point to said map defined point which represents said azimuthal component of said direction of said defined position from said variable position.

2. A method according to claim 1, wherein said map defined point is within said specified area.

3. A method according to claims 1 or 2, wherein the step of orienting the map uses a magnetic compass and said single reference position is magnetic north.

4. A method according to claim 1, wherein said specified area covers a number of degrees of latitude or longitude which is greater than said predetermined limit.

5. A method according to claim 1, said map having a projection such that map points which are equidistant from said map defined point represent positions in reality which are equidistant from said defined position in reality, the method including the further step of determining the elevational component of said direction of said defined position from said variable position by determining the separation of said map variable point from said map defined point, said separation representing said elevational component.

6. A method of determining the direction of a satellite from a variable position using the method of claim 5, wherein said specified area is the coverage region of the satellite.

7. A method of setting up a satellite antenna, comprising the method of claim 6 and the further step of directing the antenna in said map variable-defined direction.

8. A method of communication via satellite, comprising the method of claim 7 and the further step of sending signals to said satellite through said antenna.

9. An apparatus for determining the direction of a defined position from a variable position within a specified area, the apparatus comprising:

a map of said specified area, the specified area including positions which are separated from said defined position by a number of degrees of latitude or longitude greater than a predetermined limit, and a map defined point positioned relative to said map to represent said defined position relative to said specified area, said map having a map reference direction by which the azimuthal orientation of the map is determined in use, said map having a planar projection in which map points on the map represent positions in reality such that:

i) azimuthal position-reference directions from each position in reality to a single reference position are representable by map point-reference directions on the map which are parallel to or aligned with said map reference direction within said predetermined limit;

ii) a map bearing on the map of a map point-defined direction from a map point on the map to said map defined point relative to said map reference direction is equal within said predetermined limit to a bearing on reality of an azimuthal position-defined direction from a position in reality to said defined position in reality relative to an azimuthal position-reference direction from said position in reality to said reference position in reality; and means for indicating the azimuthal orientation of the map.

10. An apparatus according to claim 9, further comprising straight line representing means for representing a straight line extending at least from said map defined point to a different location, wherein said straight line representing means and said map are rotatable relative to one another.

11. An apparatus according to claim 10, wherein said straight line representing means includes a marker located on said straight line for marking said different location.

12. An apparatus according to claim 11, wherein said marker comprises magnifying means for magnifying an area of the map around said different location.

13. An apparatus according to claims 11 or 12, wherein said marker is movable along said straight line relative to said map defined point.

14. An apparatus according to claim 10, wherein said straight line representing means includes a straight line mark.

15. An apparatus according to claim 14, wherein said straight line mark extends parallel to said straight line.

16. An apparatus according to claim 10, wherein said map has a projection such that map points which are equidistant from said map defined point represent positions in reality which are equidistant from said defined position in reality, the straight line representing means being calibrated to indicate said elevational component.

17. An apparatus according to claim 9, wherein said map defined point is within said specified area.

18. An apparatus according to claim 9, wherein said specified area covers a number of degrees of latitude or longitude which is greater than said predetermined limit.

19. An apparatus according to claim 9, wherein said single reference position is magnetic north and said means for indicating the azimuthal orientation of the map comprises a magnetic compass azimuthally fixed relative to the map.

20. An apparatus according to claim 9, including a map holder for releasably holding the map.

21. A satellite earth station including a directional antenna and an apparatus according to claims 9 or 10.

22. A satellite earth station including a directional antenna and an apparatus according to claim 10, wherein said directional antenna is aligned with or parallel to said straight line.

23. A map of a specified area, the specified area including positions which are separated from a defined position by a number of degrees of latitude or longitude greater than a predetermined limit, and a map defined point positioned relative to said map to represent said defined position relative to said specified area, said map having a map reference direction by which the azimuthal orientation of the map is determined in use, said map having a planar projection in which map points on the map represent positions in reality such that:
  i) azimuthal position-reference directions from each position in reality to a single reference position are representable by map point-reference directions on the map which are parallel to or aligned with said map reference direction within said predetermined limit; and
  ii) a map bearing on the map of a map point-defined direction from a map point on the map to said map defined point relative to said map reference direction is equal to within a predetermined limit to a bearing in reality of an azimuthal position-defined direction from a position in reality to said defined position in reality relative to an azimuthal position-reference direction from said position in reality to said reference position in reality.

24. A map according to claim 23, wherein said projection is such that map points which are equidistant from said map defined point represent positions in reality which are equidistant from said defined position in reality.

25. A map according to claim 23 or 24, wherein said map defined point is within said specified area.

26. A map according to claim 23, wherein said specified area covers a number of degrees of latitude or longitude which is greater than said predetermined limit.

27. A map according to claim 23, wherein said single reference position is magnetic north.

28. A satellite earth station including a directional antenna and a map according to claim 23.

* * * * *